(12) United States Patent
Matsushima et al.

(10) Patent No.: US 7,383,451 B2
(45) Date of Patent: Jun. 3, 2008

(54) CONTROLLING POWER USAGE OF COMPUTING DEVICE COMPONENTS IN HOLISTIC MANNER

(75) Inventors: Shinji Matsushima, Kanagawa-ken (JP); Yasumichi Tsukamoto, Kanagawa-ken (JP); Mitsuhiro Yamazaki, Kanagawa-ken (JP); Seiichi Kawano, Kanagawa-ken (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 398 days.

(21) Appl. No.: 11/062,147

(22) Filed: Feb. 18, 2005

(65) Prior Publication Data

US 2006/0190745 A1     Aug. 24, 2006

(51) Int. Cl.
*G06F 1/26* (2006.01)
(52) U.S. Cl. ............... 713/300; 713/320; 713/323; 713/324
(58) Field of Classification Search ......... 713/300–340
See application file for complete search history.

(56) References Cited

U.S. PATENT DOCUMENTS

| | | | | |
|---|---|---|---|---|
| 5,560,022 A | * | 9/1996 | Dunstan et al. | 713/300 |
| 5,638,541 A | * | 6/1997 | Sadashivaiah | 713/323 |
| 5,925,134 A | * | 7/1999 | Solomon | 713/324 |
| 5,944,829 A | * | 8/1999 | Shimoda | 713/324 |
| 5,954,820 A | * | 9/1999 | Hetzler | 713/323 |
| 5,964,879 A | * | 10/1999 | Dunstan et al. | 713/340 |
| 6,289,399 B1 | | 9/2001 | Furuichi | |
| 6,574,740 B1 | * | 6/2003 | Odaohhara et al. | 713/323 |
| 6,748,547 B1 | * | 6/2004 | Inoue | 713/322 |
| 6,834,353 B2 | * | 12/2004 | Smith et al. | 713/320 |
| 6,976,178 B1 | * | 12/2005 | Kissell | 713/300 |
| 6,981,161 B2 | * | 12/2005 | Koo | 713/310 |
| 7,017,061 B2 | * | 3/2006 | Lippert et al. | 713/324 |
| 7,055,046 B2 | * | 5/2006 | Malueg et al. | 713/320 |
| 7,065,659 B2 | * | 6/2006 | Malueg et al. | 713/300 |
| 7,127,625 B2 | * | 10/2006 | Farkas et al. | 713/320 |
| 7,134,032 B2 | * | 11/2006 | Yamada et al. | 713/324 |
| 7,210,048 B2 | * | 4/2007 | Bodas | 713/320 |
| 7,243,243 B2 | * | 7/2007 | Gedeon | 713/300 |
| 2002/0133728 A1 | * | 9/2002 | Agarwal | 713/324 |
| 2004/0044914 A1 | * | 3/2004 | Gedeon | 713/300 |
| 2004/0181660 A1 | * | 9/2004 | Kato et al. | 713/1 |
| 2005/0144491 A1 | * | 6/2005 | Zayas | 713/300 |
| 2005/0240786 A1 | * | 10/2005 | Ranganathan | 713/320 |

FOREIGN PATENT DOCUMENTS

JP     1999312029 A     11/1999

\* cited by examiner

*Primary Examiner*—Nitin C. Patel
(74) *Attorney, Agent, or Firm*—Charlie Bustamante

(57) ABSTRACT

Power usage of computing device components is controlled in a holistic manner. The projected total power consumption for the computing device to satisfy a power consumption policy for the device is determined. Power usage of each component of the computing device is controlled in a holistic manner—i.e., balancing the power usage of the component against the power usage of other components—so that the total power usage of the computing device falls within the projected total power consumption needed to satisfy the power consumption policy. How the user is currently utilizing the computing device may be periodically detected, based at least on a power consumption distribution of the components of the computing device. A current usage model is determined based on how the user is currently utilizing the computing device. The power usage of each component of the computing device is controlled based on the current usage model.

20 Claims, 4 Drawing Sheets

CONTROLLING POWER USAGE OF COMPUTING DEVICE COMPONENTS IN HOLISTIC MANNER

FIELD OF THE INVENTION

The present invention relates generally to controlling the power usage of a computing device, and more particularly to controlling the power usage of the components of a computing device in a holistic manner.

BACKGROUND OF THE INVENTION

Typical portable computing devices include laptop and notebook computers and other portable computers. Unlike desktop computers, which must be constantly plugged into a wall outlet to receive power so that they can be used, portable computers include batteries so that users can use them while away from a wall outlet, such as on planes and trains, in conference rooms and so on. The batteries are rechargeable, so when they lose their power through usage of the portable computers, the computers can be plugged into a wall outlet to recharge their batteries.

Portable computers have become nearly as popular as desktop computers. The performance of portable computers has also increased to rival many desktop computers. The processing power of portable computers, their screen sizes, graphics chips, available memory, and available storage are nearly equal to that found in desktop computers. Indeed, one type of portable computer is known as the "desktop replacement," which is intended to replace a typical desktop computer. Such portable computers usually include an optical drive, and can have a wide variety of peripherals attached to them.

Unfortunately, battery technology has not increased at the same pace as other technologies used in portable computers. Therefore, how long a portable computer can run on battery power is an issue that pervades design choices in which technologies to use in portable computers. Furthermore, users have become adept at monitoring power usage within portable computers. Users may have to adjust how they use their computers to ensure that the battery charge lasts as long as is needed.

Present battery management technologies are limited, however. Major components of a portable computer can individually perform power management. For example, the central processing unit (CPU) and the graphics processor of a portable computer may be able to have their operating frequencies reduced to limit power usage. Such individual power management is typically effective, however, only if the other components of a portable computer are also not consuming large amounts of power.

Other battery management technologies include reducing the backlight for the display of a portable computer based on the amount of power remaining in the battery. However, in all of these battery management technologies, power management is not based on the load of all the components of a portable computer as a whole. Therefore, while they are effective to some degree, they still do not optimally manage the remaining power of a battery within a portable computer.

One type of power management technique is particularly described in U.S. Pat. No. 6,289,399. In this patent, a computing device determines how the computer is currently being utilized by directly monitoring the load on the processor (i.e., the CPU), as well as the frequency of input/output (I/O) access, such as access to hard disk drives. Based on how the computer is currently being utilized, power can then be conserved appropriately. However, this approach has some disadvantages. First, it does not correctly determine how the computer is being used when there is a light load on the processor. Second, it does not correctly determine how the computer is being used when there is a load on another type of device that the user is currently using, such as a graphics or video chip, or memory. Third, if the sampling rate of monitoring the frequency of I/O access is too infrequent, then the approach may not correctly determine how the computer is currently being used. At the same time however, fourth, if the sampling rate of monitoring the frequency of I/O access is too frequent, then the approach itself may cause an undue load on resources of the computing device.

For these and other reasons, then, there is a need for the present invention.

SUMMARY OF THE INVENTION

The present invention relates to controlling the power usage of computing device components in a holistic manner. As used herein, a holistic manner of controlling power usage means that many, if not all, of the components of a computing device each have its power usage balanced against the usage of the other components of the computing device, so that total power consumption is within acceptable limits. In one embodiment, the projected total power consumption for the computing device to satisfy a power consumption policy for the device is determined. This includes determining a usage model of the computing device, as to how the computing device is currently being used, based at least on a power consumption distribution of a plurality of components of the computing device. Power usage of each component of the computing device is controlled in a holistic manner—i.e., balancing the power usage of the component against the power usage of other components—so that the total power usage of the computing device falls within the projected total power consumption needed to satisfy the power consumption policy.

In one embodiment, how the user is currently utilizing the computing device is periodically detected. The current usage model is determined based on how the user is currently utilizing the computing device. The power usage of each component of the computing device is controlled based on the current usage model. For example, the amount of power needed by a hard disk drive or an optical drive to begin rotation of its spindle is determined. If the amount of power so needed causes the total power usage of the computing device to exceed the projected total power consumption, power to one or more of the other components of the computing device can be reduced temporarily so that there is sufficient power for the spindle of the drive to begin rotation.

As another example, usage models may distribute how power is consumed among the primary components of the computing device. There may be a heavy-calculation usage model, an office application usage model, a graphics, three-dimension (3D), or game usage model, and a virus scanning usage model. The computing device may switch among these usage models based on detecting how the user is currently utilizing the computing device, and/or based on the user's preference of a given usage model.

A computing device of an embodiment of the invention includes a power source, a first sensor, a number of components, a number of second sensors corresponding to the components, and a mechanism. The power source may be a power supply or a battery. The first sensor detects the amount of power currently being provided by the power source. Each second sensor detects the amount of power currently being consumed by its corresponding component. The mechanism controls total power consumed by the computing device, in a holistic manner, by monitoring the amount of power currently being provided by the power source and adjusting the amount of power currently being consumed by each component. The mechanism determines the usage model of the computing device, as to how the computing device is currently being used, based at least on a power consumption distribution of the components of the computing device.

An article of manufacture of an embodiment of the invention includes a computer-readable medium and means in the medium. The computer-readable medium may be a recordable data storage medium, a modulated carrier signal, or another type of computer-readable medium. The means is for controlling power usage of each of a number of components of a computing device in a holistic manner, so that total power usage of the device satisfies a power consumption policy. The power consumption policy may be based on user preference, and/or on periodic monitoring of the computing device to determine how the computing device is currently being utilized. The means controls power usage based on a usage model of the computing device, as to how the computing device is currently being used. This usage model is determined based at least on a power consumption distribution of the components of the computing device.

Embodiments of the invention provide for advantages over the prior art. Because power consumption is managed in a holistic manner, the battery of a portable computing device, for instance, may be able to last longer than it otherwise would. Furthermore, in the embodiments where how the computing device is currently being utilized is the basis on which power usage for the components of the device are managed, power management may be performed in such a way that the user is less aware that power management is being accomplished. That is, power consumption is controlled in order from less influence to the sensitivity of the user in detecting the power management to more influence to the sensitivity of the user in detecting the power management.

Embodiments of the invention enable controlling the power consumption of computing device components to prevent the power consumption of the computing device as a whole from exceeding an allowed capacity. Such prevention is independent of the manner by which power is being provided to the computing device. For instance, embodiments of the invention may be implemented in relation to a portable computing device having a battery with a certain amount of power, as well as to a desktop computing device having a power supply with a certain power rating. Embodiments of the invention may also control the power consumption of computing device components to ensure that the battery or other power source allows for active operation for a set period of time.

Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
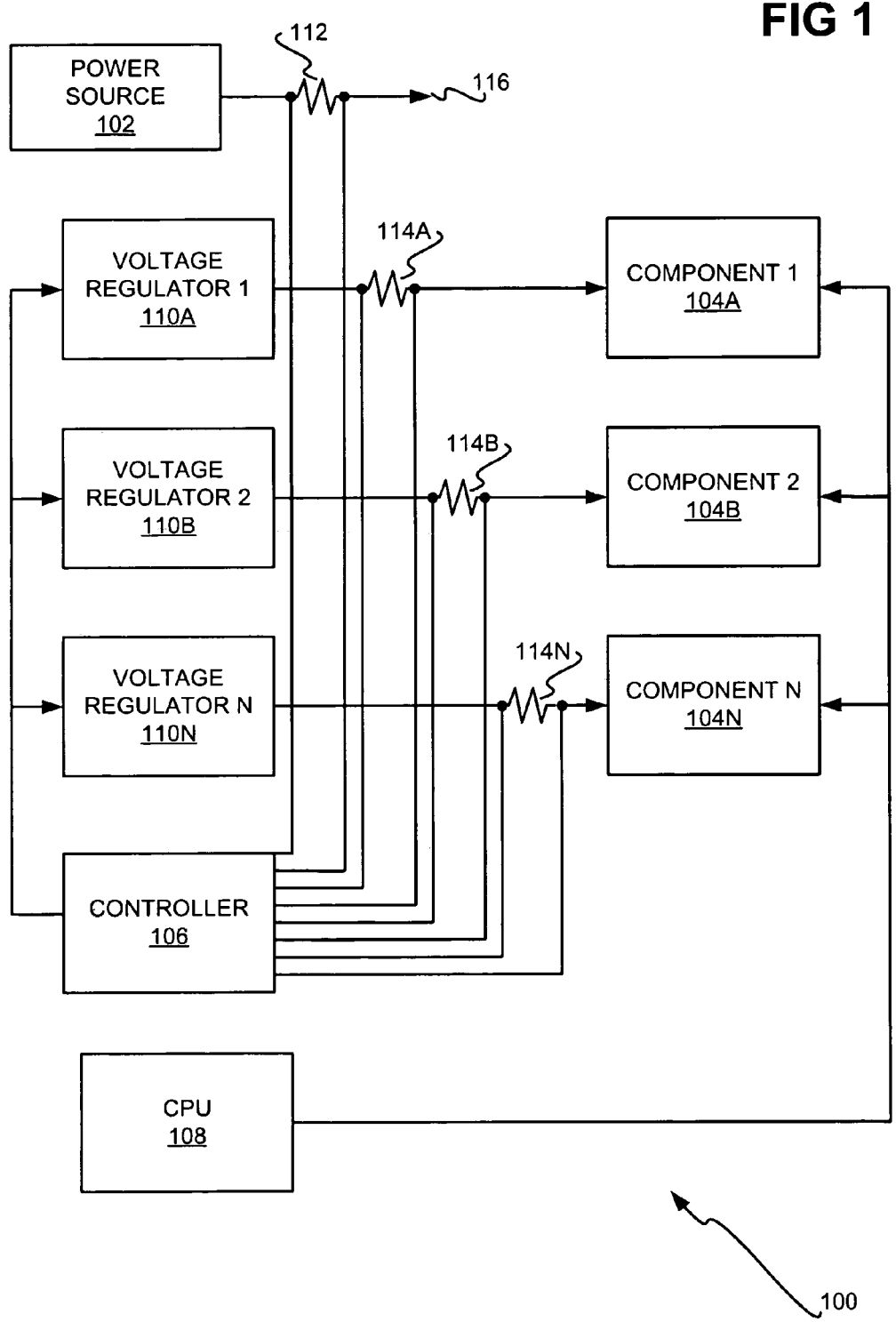
FIG. 1 is a diagram of a computing device, according to an embodiment of the invention.

FIG. 1 shows a representative computing device 100, according to an embodiment of the invention. The computing device 100 may be a laptop, notebook, or other portable computer, a desktop computer, or another type of computing device. The computing device 100 includes a power source 102 and a number of components 104A, 104B, . . . 104N, which are collectively referred to as the components 104. The power source 102 may be a battery having a given charge capacity and an amount of charge or power remaining, or a power source capable of providing a specified or limited amount of power, and that is connectable to an external power source, such as a wall outlet. The components 104 are specifically those that can have their power consumption or usage managed in one embodiment of the invention.

The computing device 100 also includes a controller 106, a main or primary central processing unit (CPU) 108, and a number of voltage regulators 110A, 110B, . . . , 110N, which are collectively referred to as the voltage regulators 110. The controller 106 may be a service processor, an embedded controller, or another type of mechanism. The controller 106 specifically performs power management as described herein. The voltage regulators 110 correspond to the components 104, and control the amount of power that can be currently provided to their corresponding components. The CPU 108 is a processor, and may be one of the components 104 in that the power consumption of the CPU 108 may be managed.

The computing device 100 further includes sense resistors 112 and 114A, 114B, . . . , 114N, the latter of which are collectively referred to as the sense resistors 114. The sense resistors 112 and 114 are more generally sensors. The sense resistor 112 senses the current being provided by the power source 102 to the computing device 100 generally, as indicated by the arrow 116, and thus the power currently being provided by the power source 102 to the computing device 100 as a whole. That is, the sense resistor 112 senses the power currently being consumed by the computing device 100 as a whole. Each of the sense resistors 114 senses the current being consumed by a corresponding one of the components 104, and thus the power currently being consumed by that corresponding component.

The controller 106 controls the total power consumed by the computing device 100 in a holistic manner. Specifically, the controller 106 monitors the amount of power currently being provided by the power source 102, and monitors and controls (i.e., adjusts) the amount of power currently being consumed by each of the components 104 by controlling the corresponding voltage regulators 110. Thus, the controller 106 is able to balance the power usage of all the components 104 individually and collectively, until the total power consumed by the computing device 100, as the amount of power being provided by the power source 102, falls within a desired limit.

In one embodiment, the controller 106 adjusts the amount of power consumed by a given one of the components 104 in the following manner. The controller 106 first requests that the CPU 108 notify the component to operate with less performance, such that the CPU 108 communicates with the component in this way. The controller 106 next adjusts the amount of power supplied to the component by adjusting or controlling the corresponding one of the voltage regulators 110.

The controller 106 may acquire power consumption values of the entire computing device 100 and of various of the components 104 at fixed intervals. To operate the device 100 with a battery as the power source 102 for a length of time specified by the user, the remaining capacity of the battery is also read, and the targeted projected total power consumption is determined to satisfy this power consumption policy. The controller 106 assigns a power budget to each of the components 104 in accordance with the current load status of the computing device 100, and controls the voltage regulators 110 and the components 104 as appropriate so that each component meets its power budget.

Figure 2:
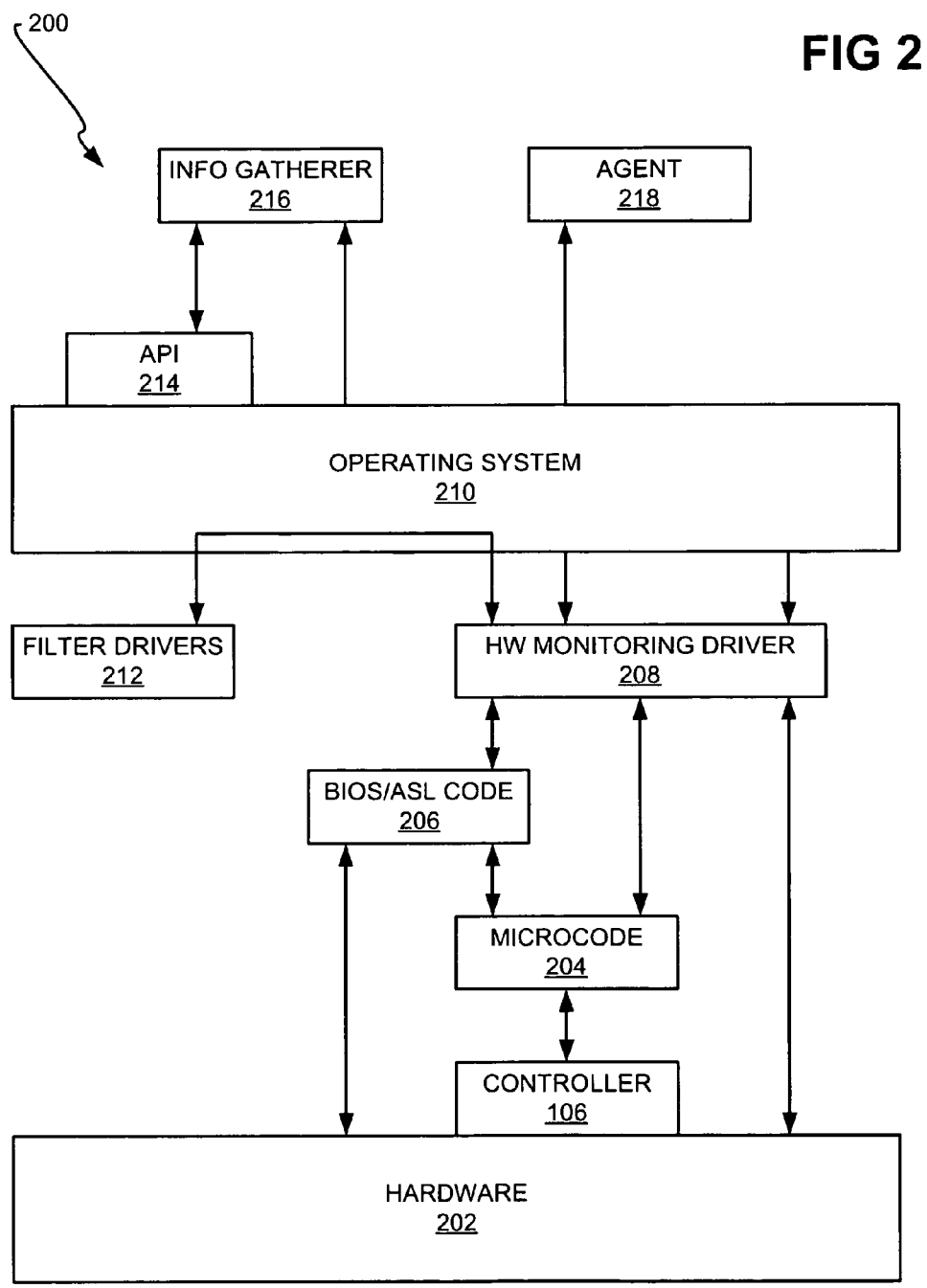
FIG. 2 is a diagram of the software power management architecture of the computing device of FIG. 1, according to an embodiment of the invention.

FIG. 2 shows a software power management architecture 200 for the computing device 100, according to an embodiment of the invention. The architecture 200 is constructed to interface with the hardware 202 of the computing device 100, including the controller 106 specifically. Microcode 204 is embedded within the controller 106, and measures the power consumption of the whole computing device 100 and power consumption of the individual components 104 of the computing device 100 on a regular basis. This information is transmitted to the hardware monitoring driver 208.

The BIOS/ASL code 206 includes basic input/output system (BIOS) and ACPI source language (ASL) code. ASL code is code provided by the advanced configured and power interface (ACPI), for power management. The code 206 transmits information from the hardware 202 and also from the microcode 204 to the hardware monitoring driver 208 in accordance with hardware control requests from the driver 208. For example, it can transmit the maximum performance level of the CPU to the operating system (OS) 210 through the driver 208. The code 206 is responsive to standard ACPI function calls. The hardware monitoring driver 208 is the policy owner for power savings control and collectively collects information from the hardware 202—that is, from the components 104 of the computing device 100. The driver 208 is able to control the performance of individual components 104 in accordance with requests from the agent 218.

The filter drivers 212 are communicated to by the hardware monitoring driver 208 through the operating system 210. The drivers 212 supervise control commands sent to the components 104 from the OS 210 via the driver 208. If, for example, a command with which the hard disk drive spindle stops is obtained, such information is transferred from the drivers 212 to the driver 208. If a control command is given to rotate the spindle again, information is similarly transferred.

The information gatherer 216 supervises the operating condition of the OS 210, via direct interaction with or monitoring of the OS 210, and/or via interaction through an application programming interface (API) 214 of the OS 210. The operating condition of the OS 210 is provided to user applications if needed. The information gatherer 216 may also receive information from the hardware monitoring driver 208 through the OS 210. The information gatherer 216 thus supervises the operating condition of the OS 210 running on the computing device 100 to determine how the device 100 is currently being utilized by a user. Such periodic detection as to how the computing device 100 is currently being utilized by the user can be used to inform power management functionality, and may also be based on user preference.

Finally, the agent 218 is a software component that provides the user interface for power management. The agent 218 obtains user-specified settings, and sets the power consumption policy of the hardware monitoring driver 208. Therefore, the agent 218 is the manner by which user interaction is achieved with the hardware monitoring driver 208 in one embodiment of the invention. The agent 218 thus receives user preference regarding how power is to be consumed by or within the computing device 100.

Figure 3:
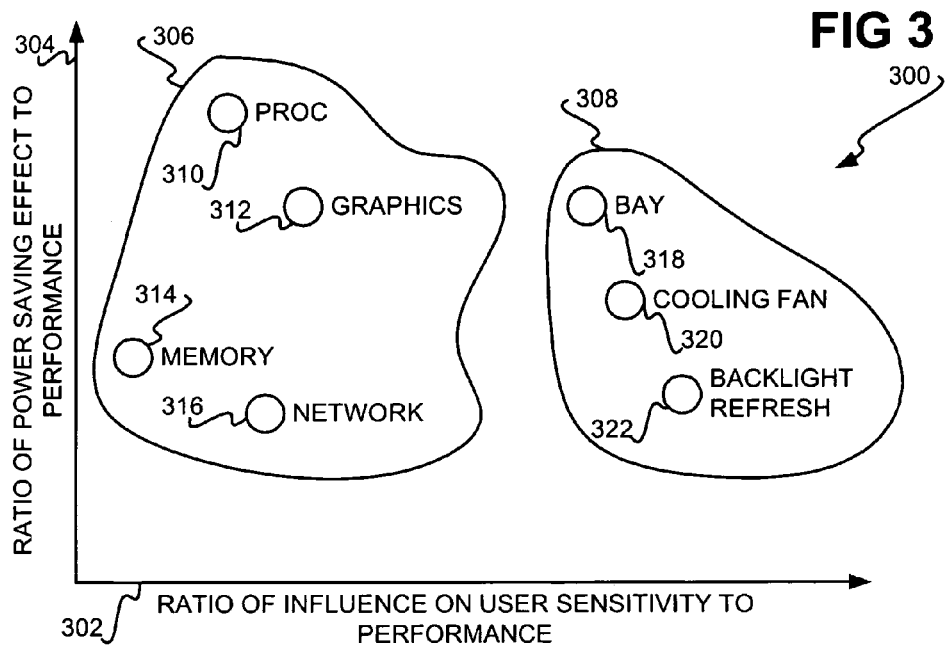
FIG. 3 is a graph of performance zones that can be employed in power management, according to an embodiment of the invention.

FIG. 3 shows a graph 300 of performance zones 306 and 308 that can be employed in power management, according to an embodiment of the invention. The graph 300 includes an x-axis 302 and a y-axis 304. The x-axis 302 indicates the ratio of the influence of power management of a component on the user sensitivity to such power management in relation to the performance of the component after such power management. That is, the more sensitive a user is to power management, based upon the user's noticing reduced performance of the component having its power being managed, the higher the value on the x-axis 302. The y-axis 304 indicates the power saving effect resulting from power management of a component in relation to the performance of the component. That is, the greater the power savings effect in relation to the performance of a component, the higher the value on the y-axis 304.

Thus, the point 310 indicates that for a processor, when power reduction is in effect for the processor, the user is not likely to notice the performance reduction, but the power savings effect is great. Similarly, for graphics, as indicated by the point 312, when power reduction is in effect, the user is not likely to notice the performance reduction, but the power savings effect is great. For memory, as indicated by the point 314, the user is even less likely to notice the performance reduction, but the power savings achieved is less, too. By comparison, for networking, as indicated by the point 316, the user is more likely to notice the performance reduction, and the power savings achieved is less.

For bay-powered devices, like optical disc drives, as indicated by the point 318, the user is more likely to notice a performance reduction, and the power savings effect is middling. As indicated by the point 320, for the cooling fan of the computing device 100, the user is even more likely to notice a performance reduction, and the power savings effect is less. Finally, as indicated by the point 322, for the backlight refresh rate for the screen of a portable computing device, the user is most likely to notice a performance reduction, and the power savings effect is at a minimum.

The points 310, 312, 314, and 316 are organized in a first zone 306, and the points 318, 320, and 322 are organized in a second zone 308. One embodiment of the invention distributes the performance control of the components 104 of the computing device 100 for which power savings control is performed, and the influences of such control upon the sensitivity of the user to such power savings control, within such zones 306 and 308. The zone 308 is a usability zone, in that power savings control can be achieved only with greatly influencing the user's perception or sensitivity to the performance degradation resulting from such power savings control. Therefore, components within the zone 308 may be the last components that have power reduced thereto to achieve power savings, since doing so means that the user's ability to use the computing device 100 is impaired, at least in perception.

By comparison, the zone 306 is a performance zone, in that power savings control can typically be achieved with only mildly influencing the user's perception or sensitivity to the performance degradation from such power savings control. Therefore, components within the zone 306 may be the first components that have power reduced thereto to achieve power savings, since doing so means that the user is less able to perceive that the computing device 100 has had its performance impaired. Embodiments of the invention therefore control power usage of the components 104 of the computing device 100 by dividing the components 104 into zones based on the user's ability to discern or perceive reductions in performance of the components 104 resulting from power management of the components 104.

Figure 4:
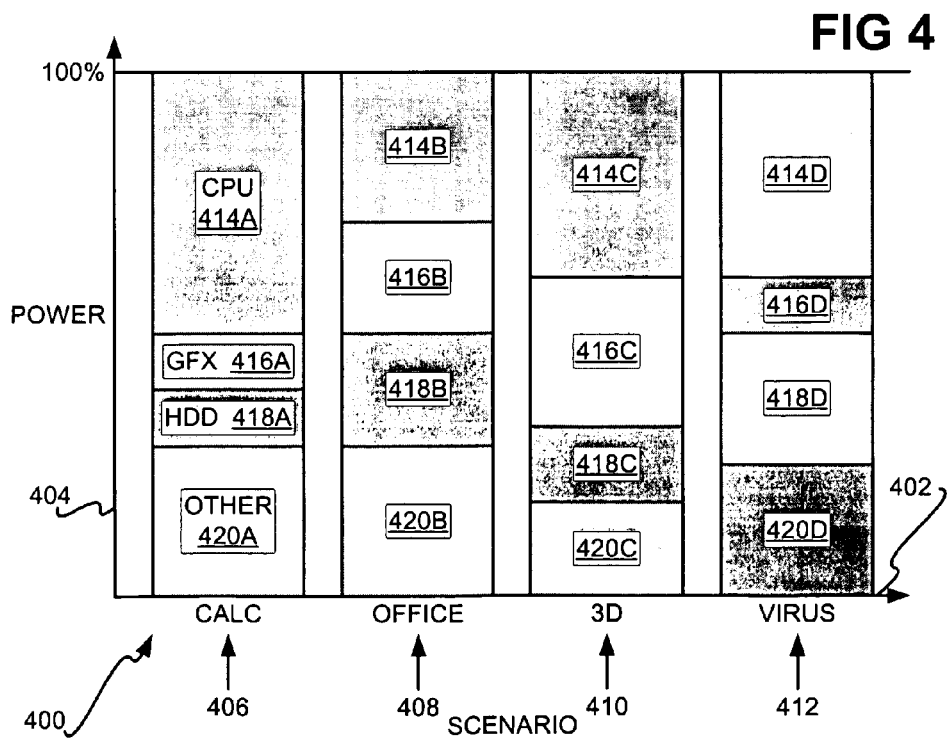
FIG. 4 is a graph of power utilization by component in various usage models, according to an embodiment of the invention.

FIG. 4 shows a graph 400 depicting how power is divided among the various components 104 of the computing device 100 in accordance with different usage models, according to an embodiment of the invention. The x-axis 402 specifies four such usage models: a calculations-intensive usage model 406, a typical office applications usage model 408, a gaming, 3D, or graphics-intensive usage model 410, and a virus-scanning usage model 412. The usage models may be user selected, and/or one embodiment of the invention constantly monitors usage of the computing device 100 to select the appropriate model. The y-axis 404 indicates power usage, specifying how each of a number of components receives power—and thus the performance of these components—in each of the models, to add up to 100% total power usage. There may be different models for portable computers, for desktop computers, for server computers, and so on.

The calculations-intensive usage model 406 is when processor performance is greatly required. Therefore, the CPU 414A receives most of the power, and the graphics sub-system 416A, the hard disk drive 418A, and other components 420A receive less power. That is, the CPU 414A has the highest operating rate, and the other components have lesser operating rates. The typical office application usage model 408 is the usage scenariomodel when the computer is being used for creating and viewing email and documents, such as word processing documents. High throughput is not required, but high turn-around time is required to avoid breaking the continuity of thought of a user. Therefore, the CPU 414B receives about the same amount of power, with the same amount of performance, as the graphics sub-system 416B, the hard disk drive 418B, and the other components 420B. That is, it is important that each of the components is able to readily respond to the user when needed, even if overall throughput of those components need not be great.

The graphics-intensive usage model 410 is when graphics and processor requirements are high. Therefore, the CPU 414C and the graphics sub-system 416C have high amounts of power to provide for their high performance, and the hard disk driver 418C and the other components 420C receive less power for less performance. The virus-scanning usage model 412 results when all of the files on disk are being scanned for viruses. Therefore, processing usage is high, as noted by the CPU 414D using a large amount of power, and hard disk drive performance is important, as noted by the hard disk drive 418D using a large amount of power, too. Graphics usage is less important, and therefore the graphics sub-system 416D can have reduced power. Similarly, the other components 420D use only an average amount of power, and their performance is not critical.

In one embodiment, the models 406, 408, 410, and 412 are used as patterns to match the present or current usage of the computing device 100, to determine in accordance with which of the models the user is currently operating the computing device 100. That is, the current distribution of power to the components of the computing device 100 are used to determine the model the user is currently operating the computing device in accordance therewith—the current distribution of power to the components is thus matched against the distributions of power of the various usage models 406, 408, 410, and 412. Thereafter, a power savings approach for that model is put into effect to further reduce power, but to ensure that the performance needs of the most important components of the device 100 in accordance with the current usage model are maintained. That is, by detecting the current usage model in accordance with which the computing device 100 is being operate, this embodiment of the invention is then able to optimally determine how to best or optimally balance the power needs (and thus the performance needs) of the various components 104 of the device 100.

For instance, in the virus-scanning usage model 412, the embodiment reduces power to the graphics sub-system 416D maximally, and only minimally, if at all, reduces power to the CPU 414D and the hard disk drive 418D. By comparison, in the calculations-intensive model 406, the embodiment reduces power to the graphics sub-system 416A and the hard disk drive 418A maximally, but only minimally, if at all, reduces power to the CPU 414A. In this sense, power reduction or management is accomplished by embodiments of the invention in a holistic manner. The power and performance needs of all the components 104 of the computing device 100 are balanced against one another to determine which of the components 104 are most deserving of high power usage (and higher performance), and which are most deserving of low power usage (and lower performance).

Figure 5:
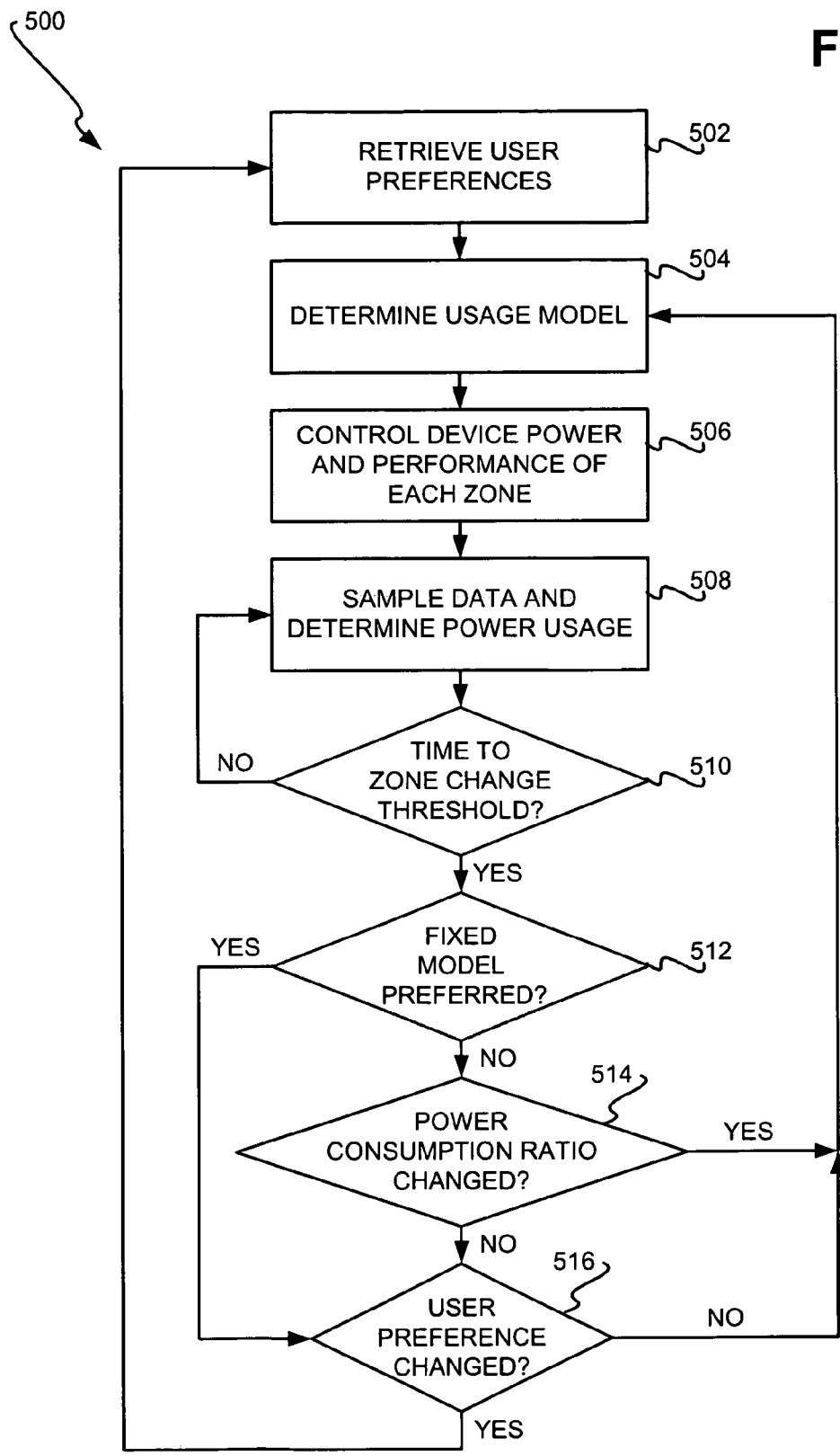
FIG. 5 is a flowchart of a method for achieving power management of a computing device in a holistic manner, according to an embodiment of the invention.

FIG. 5 shows a method 500 for achieving power management of the computing device 100 in a holistic manner, according to an embodiment of the invention. The method 500 may be performed by the controller 106 of FIG. 1, and/or by the software architecture 200 of FIG. 2. First, user preferences are retrieved (502). For instance, the user may have specified that a given usage model be used, or that the computing device 100 detect the current usage model to be employed based on actual current operating conditions of the computing device 100 by the user. Such user preferences thus specify a power consumption policy in accordance with which power of the components 104 of the computing device 100 are to be controlled in a holistic manner.

Based on the user preferences, then, a usage model is determined is selected (504). For instance, the user may specify that a given usage model be used. Alternatively, the computing device 100 may detect the current operation conditions of the computing device 100 by the user, and match these operating conditions against one of a number of preexisting usage models, such those of FIG. 4 that have been described. That is, the usage model may be determined based on how the user is currently utilizing the computing device 100. The usage model or the power consumption policy more generally in one embodiment specifies the projected total power consumption for the computing device that is necessary to satisfy the model or policy (i.e., the usage model being part of a power consumption policy in instances where the user has specified the usage model).

The power consumption policy (such as the usage model and/or the user preferences) may specify that there is a desired amount of power usage for controlling the discharge of a battery of the computing device 100, where the device 100 is a portable computer. That is, the user may specify that the battery needs to power the system for a specified length of time. If the amount of total power remaining in the battery is P, and the user wants the computer to power the system for a length of time T, then such user preference will cause the total projected power consumption to not exceed on average the amount of power P divided by T. As another example, the power source of the computing device 100 may be a power supply that is only capable of providing a certain amount of power. Therefore, the projected total power consumption cannot exceed this power wattage rating of the power supply.

In general, there are three types of power consumption policies that can be used in accordance with embodiments of the invention. First, a battery is used to power the computing device 100, and the user wishes to have the battery last for a specified length of time. Second, the user has specified a fixed usage model (which is considered to be part of the power consumption policy in such an embodiment), such that power is managed in accordance with this usage model. Third, the user has specified that the usage model be dynamically selected, such that the method 500 is to determine how the user is currently using the computing device 100 and select a usage scenariomodel based thereon, and the power consumption policy is such that the usage model is to be dynamically selected based on current utilization of the computing device 100. Where the power source is a power supply only capable of providing a certain amount of power, either of the latter two policies may be employed.

Next, device power and performance of each zone are controlled (506). Power and performance control of devices, i.e. the components 104 of FIG. 1, may be achieved as has been described in relation to FIG. 1. The components of the performance zone 306 of FIG. 3 may first have their power controlled, and if that does not yield sufficient power savings, then the components of the performance zone 308 of FIG. 3 may then have their power controlled. That is, the power usage of each of a number of components is controlled in a holistic manner so that the total power usage of the computing device 100 falls within the projected total power consumption needed to satisfy the given power consumption policy, such as a given model that is user specified or dynamically selected based on current operating conditions of the computing device 100.

Next, data is sampled and power usage noted, based on the power control put into effect in 506 (508). Specifically, the power usage of each of the components 104 of the computing device 100 is determined via determining the voltages of the sensors, on which basis such power usage is determined. Furthermore, the power usage of the entire computing device 100 as a whole is determined via determining the voltage of the sensor for the power source of the device 100, which is the data on which basis such power usage is determined. A threshold length of time is waited for (510), such that during that length of time, voltage data is continually sampled and power usage recorded to achieve an average power usage during the length of time.

Once the threshold length of time has past (510), if a fixed usage model is not desired by the user (512), then the method 500 determines whether the power consumption ratio is changed sufficient to warrant a new usage model to be selected (514). If so, then the method 500 repeats at 504. Thus, the method 500 in this case periodically detects how the user is currently utilizing the computing device, based on the current power distribution of or among the components of the computing device, and redetermines a current usage model based thereon as appropriate. However, if a fixed usage model is indeed desired by the user (512), or if the power consumption ratio has not changed (514), then the method 500 determines if the user has changed his or her preferences (516). If so, then the method 500 repeats at 502; otherwise, the method 500 repeats at 504, where the same usage model is again selected.

Controlling power usage in 506 in one embodiment of the invention can encompass accommodating temporary power spike conditions. For instance, a hard disk drive or an optical disk drive may need extra power to begin rotation of its spindle. This amount of power is determined. If such power causes the total power usage of the computing device to exceed the projected total power consumption, then power is reduced to one or more other components of the computing device, temporarily, so that there is sufficient power for the spindle to begin rotation. Once the spindle starts rotating, it requires less power, so power can again be increased to the other components of the computing device that have had their power temporarily reduced.

It is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of embodiments of the present invention. Therefore, it is manifestly intended that this invention be limited only by the claims and equivalents thereof.

We claim:

1. A method comprising:
   determining a projected total power consumption for a computing device to satisfy a power consumption policy for the computing device, including determining a current usage model of the computing device as to how the computing device is currently being used by matching a current power consumption distribution of a plurality of components of the computing device against a power consumption distribution of the plurality of components of the computing device of each of a plurality of predetermined usage models of the computing device,
      where the current power consumption distribution of the plurality of components of the computing device means how power is distributed among the components of the computing device, as consumed by the components of the computing device, where the current usage model of the computing device is selected as the predetermined usage model having a power consumption distribution that most closely matches the current power consumption distribution of the plurality of components of the computing device; and, controlling power usage of each of the plurality of components of the computing device so that total power usage of the computing device falls within the projected total power consumption needed to satisfy the power consumption policy.

2. The method of claim 1, wherein determining the projected total power consumption for the computing device to satisfy the power consumption policy for the computing device comprises determining the usage model of the computing device further based at least on user preference.

3. The method of claim 1, wherein determining the projected total power consumption for the computing device to satisfy the power consumption policy for the computing device comprises determining the usage model of the computing device further based at least on how a user is currently utilizing the computing device.

4. The method of claim 1, further comprising:
periodically detecting how the user is currently utilizing the computing device;
determining the usage model based on how the user is currently utilizing the computing device; and,
controlling the power usage of each component of the computing device based on the usage model.

5. The method of claim 1, wherein the projected total power consumption for the computing device is based at least on a desired amount of power usage for controlling battery discharge of the computing device.

6. The method of claim 1, wherein the projected total power consumption for the computing device is based at least on a maximum amount of power capable of being provided by a power supply of the computing device, such that the power consumption policy is such that the computing device is to have power managed so that run-time thereof lasts for a user-specified length of time.

7. The method of claim 1, wherein controlling the power usage of each of the plurality of components of the computing device comprises determining an amount of power needed by a hard disk drive or an optical drive to begin rotation of a spindle thereof, and where the amount of power needed to begin rotation of the spindle causes the total power usage of the computing device to exceed the projected total power consumption, reducing power of one or more other components of the computing device temporarily so that there is sufficient power for the spindle to begin rotation.

8. The method of claim 1, wherein controlling the power usage of each of the plurality of components of the computing device comprises dividing the components into a plurality of zones corresponding to user sensitivity to power management of the components.

9. A computing device comprising:
a power source;
a first sensor to detect an amount of power currently being provided by the power source;
a plurality of components;
a plurality of second sensors corresponding to the plurality of components, each second sensor to detect an amount of power currently being consumed by a corresponding component; and,
a mechanism to control total power consumed by the computing device by monitoring the amount of power currently being provided by the power source, determining a current usage model of the computing device as to how the computing device is currently being used based at least on a current power consumption distribution of the components, and adjusting the amount of power currently being consumed by each component,
wherein the current usage model of the computing device is determined by the mechanism matching the current power consumption distribution of the plurality of components of the computing device against a power consumption distribution of the plurality of components of the computing device of each of a plurality of predetermined usage models of the computing device,
where the current power consumption distribution of the plurality of components of the computing device means how power is distributed among the components of the computing device, as consumed by the components of the computing device,
where the current usage model of the computing device is selected as the predetermined usage model having a power consumption distribution that most closely matches the current power consumption distribution of the plurality of components of the computing device.

10. The computing device of claim 9, wherein the mechanism is to adjust the amount of power currently being consumed by each component at least by communicating with the component to cause the component to operate with less performance, such that the component consumes less power.

11. The computing device of claim 9, further comprising a plurality of voltage regulators corresponding to the plurality of components, each voltage regulator controlling the amount of power currently that can be provided to a corresponding component,
wherein the mechanism is to adjust the amount of power currently being consumed by each component by at least controlling the voltage regulator corresponding to the component to reduce the amount of power provided to the component.

12. The computing device of claim 9, wherein the mechanism is to control total power consumed by the computing device based at least on user preference.

13. The computing device of claim 9, wherein the mechanism is to control total power consumed by the computing device based at least on periodic detection as to how the computing device is currently being utilized by a user.

14. The computing device of claim 9, wherein the mechanism comprises:
a first software component to supervise an operating condition of an operating system running on the computing device to determine how the computing device is being utilized by a user; and,
a second software component to collect information regarding the components.

15. The computing device of claim 14, wherein the mechanism further comprises a third software component to receive user preference regarding how power is to be consumed by the computing device.

16. The computing device of claim 14, wherein the power source is a battery, such that the computing device is a portable computing device.

17. The computing device of claim 14, wherein the power source is a power supply connectable to an external power source, and the power source is able to provide a limited amount of power to the components of the computing device.

18. An article of manufacture comprising:
a recordable data storage medium; and,
means in the medium for controlling power usage of each of a plurality of components of a computing device so that total power usage of the computing device satisfies a power consumption policy, based on a current usage model of the computing device as to how the computing device is currently being used as determined based on a current power consumption distribution of a plurality of components of the computing device,
wherein the means is further for matching the current power consumption distribution of the plurality of components of the computing device against a power consumption distribution of the plurality of components of the computing device of each of a plurality of predetermined usage models of the computing device, where the current power consumption distribution of the plurality of components of the computing device means how power is distributed among the components of the computing device, as consumed by the components of the computing device,
where the current usage model of the computing device is selected as the predetermined usage model having a power consumption distribution that most closely matches the current power consumption distribution of the plurality of components of the computing device.

19. The article of manufacture of claim 18, wherein the power consumption policy is based at least on user preference.

20. The article of manufacture of claim 18, wherein the power consumption policy is based at least on periodic monitoring of the computing device to determine how the computing device is currently being utilized.

* * * * *